United States Patent Office 3,272,849
Patented Sept. 13, 1966

3,272,849
**17-DIETHOXYETHYL ETHERS OF 3-ALKOXY-
1,3,5(10)-ESTRATRIENES**
Gerhard R. Wendt, Havertown, and Kurt W. Ledig, Philadelphia, Pa., assignors to American Home Products Corporation, New York, N.Y., a corporation of Delaware
No Drawing. Filed Oct. 1, 1965, Ser. No. 492,304
3 Claims. (Cl. 260—397.5)

This invention relates to novel 17-diethoxyethyl ethers of 3-alkoxy-1,3,5(10)-estratrienes and to a method for producing the same.

The claimed compounds, which, as determined by standard pharmacological tests in experimental animals, exhibit anti-inflammatory and anti-lipemic activity, can be represented by the following general formula:

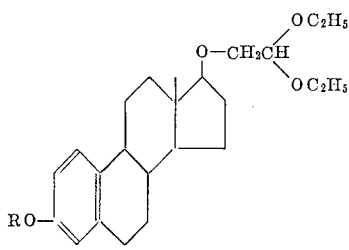

wherein the symbol R denotes alkyl groups having from 1 to 6 carbon atoms or alicyclic groups of 5 to 6 carbon atoms.

The alkoxy substituent noted as the 3-alkoxy group may comprise various types of ether groups and can be straight chained or branched. The preferred types of such ether groups are the lower alkoxy ether groups such as ethoxy, propoxy, butoxy, as well as cyclopentyloxy and cyclohexyloxy.

The synthesis of the claimed compounds is illustrated below:

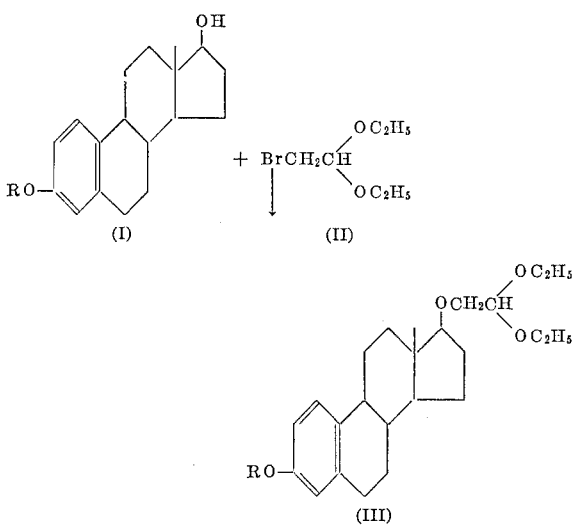

As shown, the compounds of interest are prepared by forming a suspension of an estradiol-3-alkoxy ether (I) and sodium hydride in the form of a 50% oil dispersion. The suspension is refluxed at its boiling point for about an hour. An excess of bromoacetaldehyde diethyl acetal (II) next is added slowly. The resulting reaction mixture is refluxed for about four hours and allowed to stand at 25° C. overnight. Absolute alcohol is then added to destroy excess hydride and the reaction mixture is washed with water and brine and then dried. After removal of the solvent, the residue is chromatographed over neutral alumina. The column is eluted with petroleum ether and then with benzene. Distillation in vacuo of the benzene eluate yields the final product.

The invention is further illustrated by the following examples:

EXAMPLE I

*d-17β-[2-(diethoxy)ethoxy]-3-methoxyestra-1,3,5(10)-triene*

A suspension of 5.0 g. estradiol-3-methyl ether and 3.93 g. sodium hydride (50% dispersion) was refluxed for one hour, then 18.5 ml. of bromoacetaldehyde diethyl acetal was added over a period of ½ hour and the reaction mixture refluxed for four hours then let stand at 25° C. overnight. Absolute alcohol was added to destroy the excess hydride then the reaction mixture was washed with water, brine and finally dried over $MgSO_4$. After removal of the solvent, the residue was chromatographed over neutral grade III alumina. After elution of the oil with petroleum ether, the material was eluted with benzene to give 3.0 g. of residue which was distilled at 185–187° (air bath) at $1 \times 10^{-3}$ mm. to give 2.5 g. of the title compound. IR: no OH.

Elemental analysis confirmed the empirical formula for $C_{25}H_{38}O_4$.

When applying the procedure of Example 1 to the starting materials listed below, the products hereinafter disclosed are obtained:

| Starting materials | Products |
| --- | --- |
| Estradiol-3-ethyl ether | d-17β-[2-(diethoxy)ethoxy]-3-ethoxy-estra-1,3,5(10)-triene. |
| Estradiol-3-butyl ether | d-17β-[2-(diethoxy)ethoxy]-3-butoxy-estra-1,3,5(10)-triene. |
| Estradiol-3-isopropyl ether | d-17β-[2-(diethoxy)ethoxy]-3-isopropoxyestra-1,3,5(10)-triene. |
| Estradiol-3-cyclopentyl ether | d-17β-[2-(diethoxy)ethoxy]-3-cyclopentyloxyestra-1,3,5(10)-triene. |
| Estradiol-3-cyclohexyl ether | d-17β-[2-(diethoxy)ethoxy]-3-cyclohexyloxyestra-1,3,5(10)-triene. |

In addition to having capacity to regulate blood lipid levels, the compounds of the invention are useful for their general hormonal effect, particularly in the female and would, therefore, be expected to exhibit utility in those areas where natural estrogens are employed. When so utilized, the effective administered dosage of the compounds of the invention will depend upon the severity of the condition and the individual characteristics of each case wherein they are employed. Generally, a dosage range of from about 0.5 mg. to about 20.0 mg. per kilo of body weight per day would constitute the overall range.

The novel compounds of our invention in their tangible embodiment form may be administered in more than one way. They may be administered either orally, intravenously or intramuscularly. When so administered as pharmaceutical products, they of course can be administered singly or in combination with other active or inert ingredients in dosage unit form. If desired, they may be combined with a large number of compatible non-toxic diluents, carriers, binders and excipients to form a pharmaceutical preparation. Such typical liquid carriers as water, mineral oil or a non-toxic alcohol may be admixed therewith where preparations suitable for injection are to be prepared. Carboxymethylcellulose, starches, various sugars and the like, may be employed where tablets or powders are to be formed as a means of oral administration.

What is claimed is:
1. A compound of the formula:

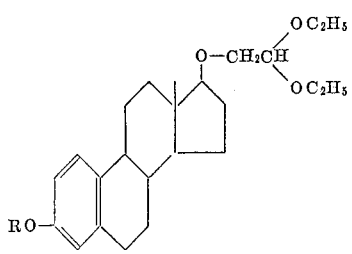

wherein R is a lower alkyl group having from 1 to 6 carbon atoms.

2. d - 17β - [2 - (diethoxy)ethoxy] - 3 - methoxyestra-1,3,5(10)-triene.

3. The method which comprises reacting an estradiol-3-alkoxy ether with bromoacetaldehyde diethyl acetal in the presence of sodium hydride and at the reflux temperature of the reaction mass and recovering the resulting d-17β-[2-(diethoxy)ethoxy]-3-alkoxyestra-1,3,5(10)-triene.

References Cited by the Examiner

Baganz et al.: Ber. Deut. Chem. Ges., 86, pp. 148–154 (1953).

LEWIS GOTTS, *Primary Examiner.*

THOMAS M. MESHBESHER, *Assistant Examiner.*